United States Patent [19]

Hanson

[11] Patent Number: 5,036,715
[45] Date of Patent: Aug. 6, 1991

[54] CANTILEVERED FORCE SENSING ASSEMBLY UTILIZING ONE OR TWO RESONATING FORCE SENSING DEVICES

[76] Inventor: Richard Hanson, 12921 182nd Ave. N.E., Redmond, Wash. 98052

[21] Appl. No.: 375,186

[22] Filed: Jun. 30, 1989

[51] Int. Cl.⁵ .......................... G01L 1/10; G01L 19/02
[52] U.S. Cl. .................................. 73/862.59; 73/704; 73/DIG. 10
[58] Field of Search ............. 73/862.59, 517 AV, 704, 73/778, DIG. 1, DIG. 10

[56] References Cited

U.S. PATENT DOCUMENTS

| | | | |
|---|---|---|---|
| 2,772,569 | 12/1956 | Ruge | 73/DIG. 10 |
| 4,091,679 | 5/1978 | Furusawa et al. | 73/DIG. 1 |
| 4,382,385 | 5/1983 | Paros | 73/702 |
| 4,479,385 | 10/1984 | Koehler | 73/517 AV |
| 4,594,898 | 6/1986 | Kirman et al. | 73/862.59 |
| 4,751,849 | 6/1988 | Paros et al. | 73/862.59 |
| 4,838,369 | 6/1989 | Albert | 73/862.59 |

Primary Examiner—Charles A. Ruehl
Attorney, Agent, or Firm—Flehr, Hohbach, Test, Albritton & Herbert

[57] ABSTRACT

A force sensing assembly and particularly one which is especially suitable for use as a pressure transducer is disclosed herein. This assembly includes at least one and preferably a stacked pair of resonating type force sensing devices supported from one end in a cantilvered fashion.

23 Claims, 3 Drawing Sheets

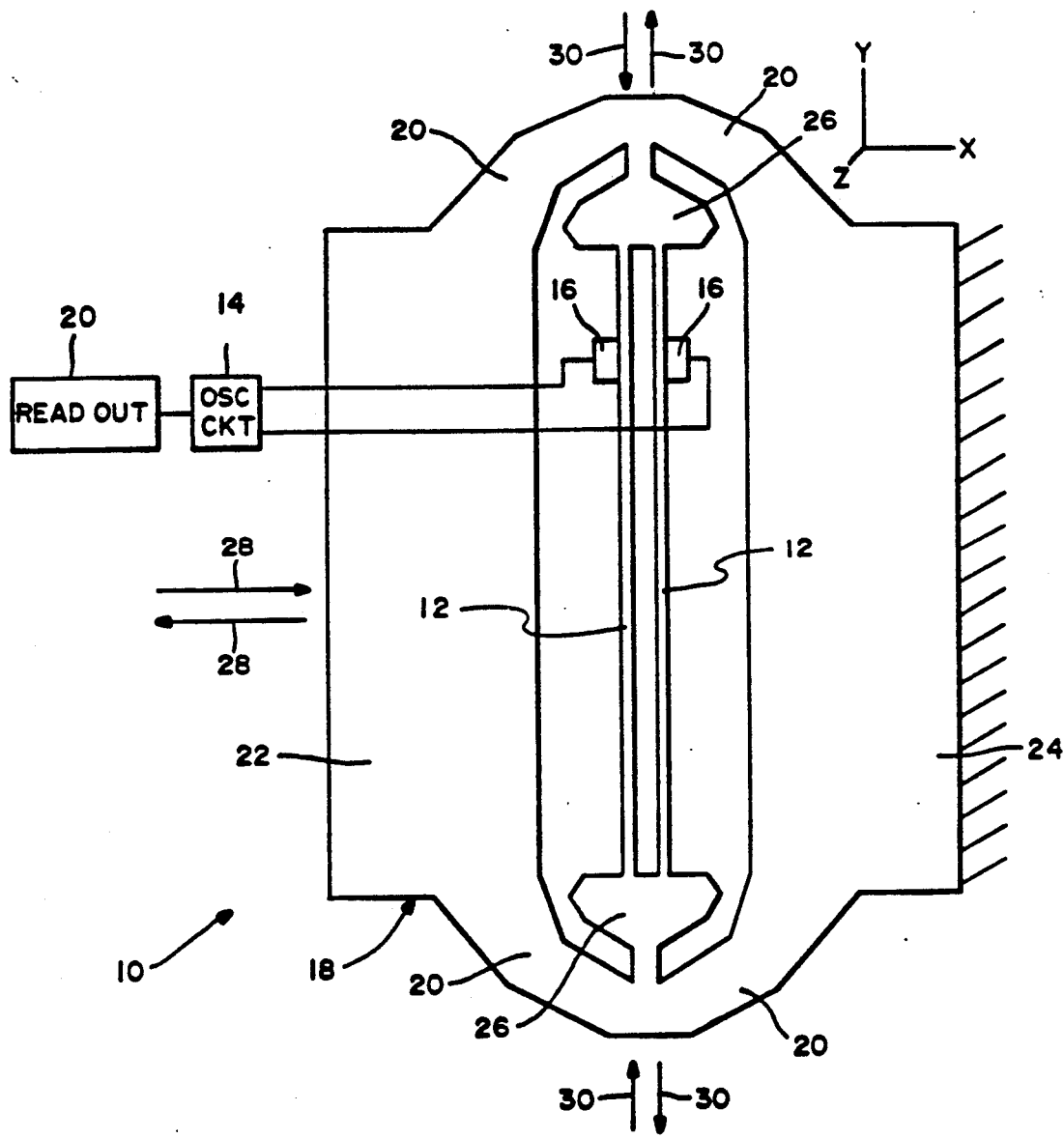
FIG.—1
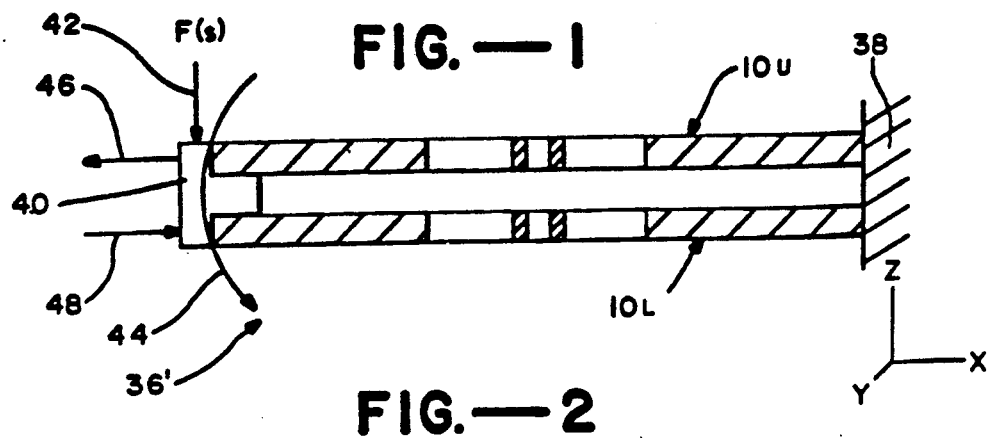
FIG.—2

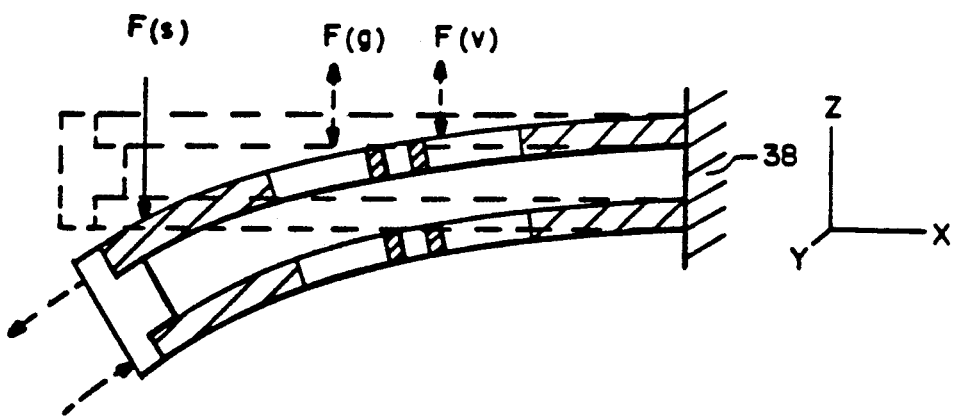
FIG.—3
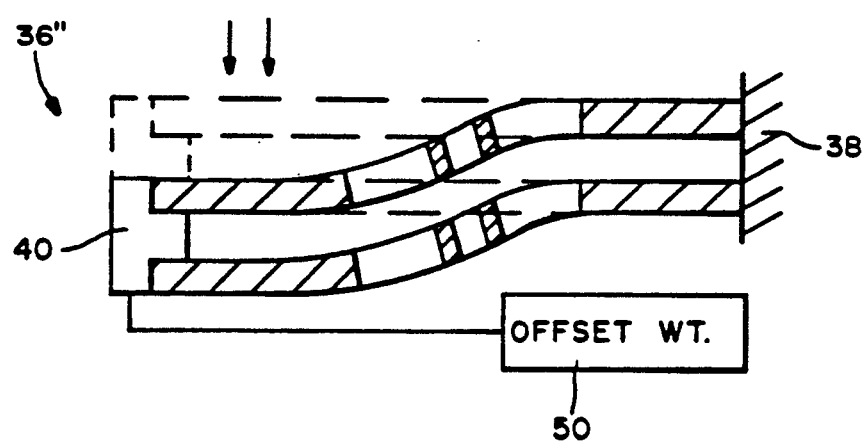
FIG.—4
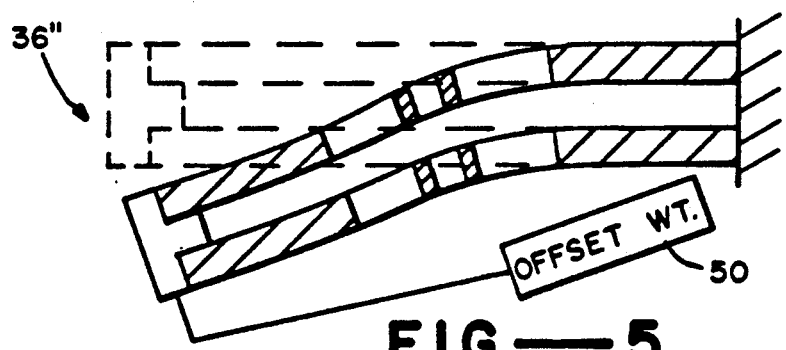
FIG.—5
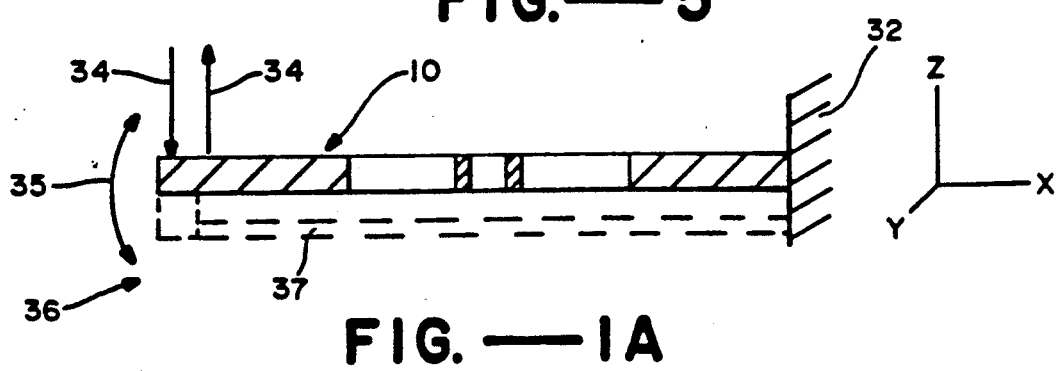
FIG.—1A

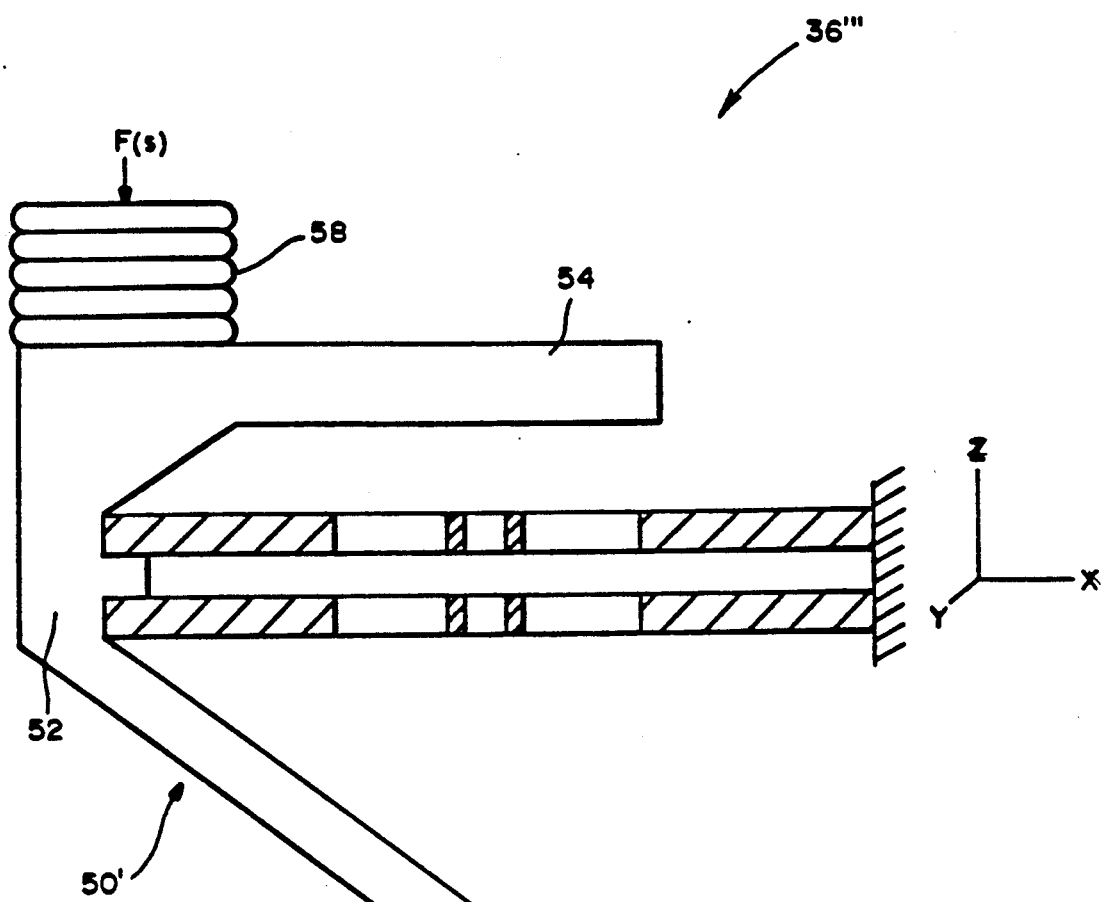
FIG.—6
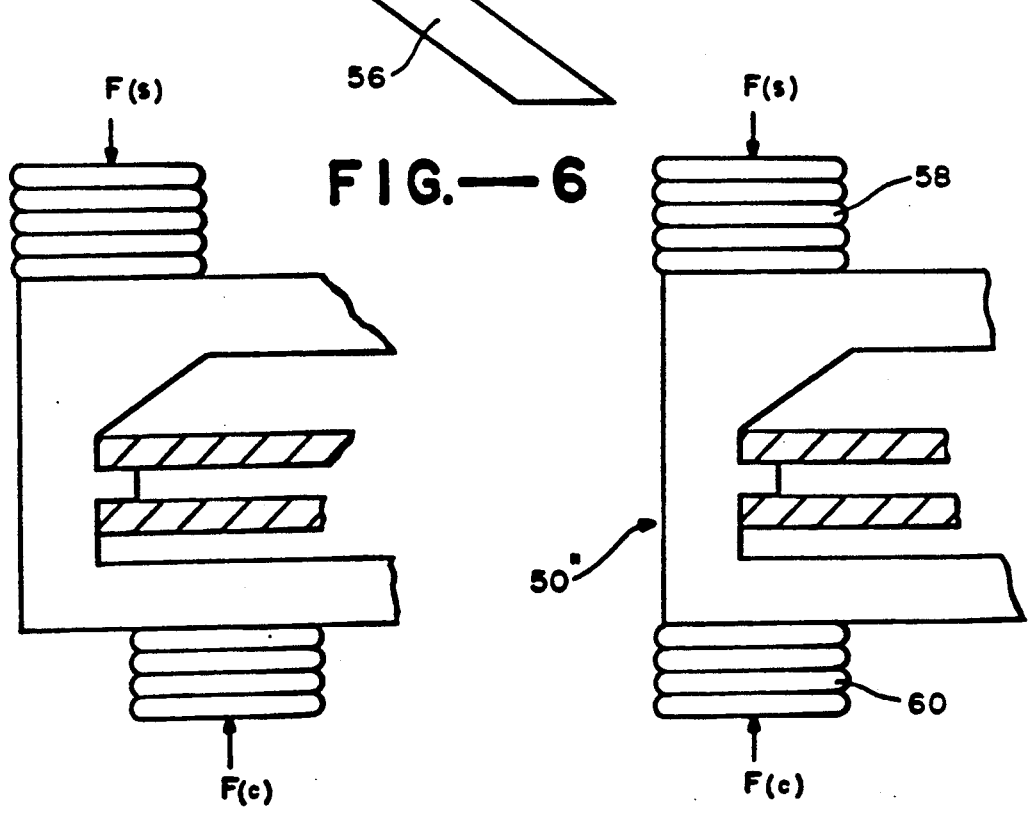
FIG.—8
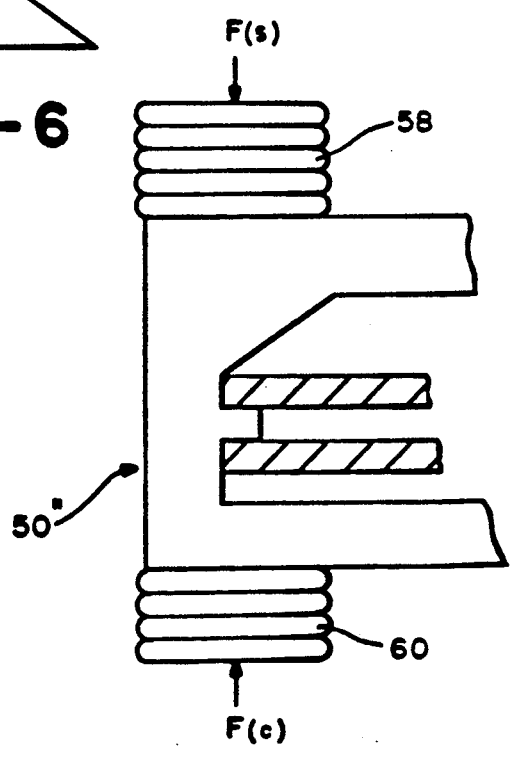
FIG.—7

CANTILEVERED FORCE SENSING ASSEMBLY UTILIZING ONE OR TWO RESONATING FORCE SENSING DEVICES

The present invention relates generally to force sensing assemblies and more particularly to an assembly which utilizes a specific pair of resonating type force sensing devices mounted in a specific cantilevered fashion.

Resonating types of force sensing devices are well known in the art. Examples may be found in Paros U.S. Pat. No. 4,382,385; Koehler U.S. Pat. No. 4,479,385; and Paros et al. U.S. Pat. No. 4,751,849. Of particular interest is the Koehler arrangement which supports upper and lower resonating devices in a cantilevered fashion. A specific drawback with this arrangement is that its tines (vibrating components) extend parallel to the cantilever axis. Therefore, if the tines are to be sufficiently long to provide satisfactory sensitivity, the cantilever itself must be at least that long, actually longer when the support for the tines are taken into account. However, increasing the length of the cantilever compromises structural integrity and reduces the magnitude of sensing force (for example pressure) that can be applied to the arrangement.

As will be seen hereinafter, the present invention provides resonating types of force sensing devices which are also supported in a cantilevered fashion, but which are supported such that their tines extend normal to the cantilevered direction. In that way, the tines can be made relatively long in order to increase sensitivity while the cantilever can be short in order to sense forces of greater magnitude. The force sensing assembly disclosed herein is especially suitable for use as a load cell or pressure transducer within an environment which is also subjected to acceleration, for example, in a vehicle.

As will also be seen hereinafter, the cantilevered supported resonating device forming part of the present assembly is weighted in a way which causes acceleration forces acting on the devices in the same direction as the forces being sensed to have substantially no effect on the devices ability to accurately sense the sensing forces. In a third embodiment, these latter forces, that is, the sensing forces, are applied to the resonating devices by means of one or more bellows in order to isolate the devices from their structural and environmental surroundings.

The overall force sensing assembly disclosed herein will be described in more detail hereinafter in conjunction with the drawings wherein:

FIG. 1 is a diagrammatic illustration of a resonating type of force sensing device which forms part of the force sensing assembly of the present invention;

FIG. 1A diagrammatically illustrates a single device of the type shown in FIG. 1, mounted in a cantilevered fashion to form a sensing assembly of the present invention;

FIG. 2 diagrammatically illustrates two devices of the type shown in FIG. 1, mounted on top of one another in a cantilevered fashion to form a sensing assembly of the present invention;

FIG. 3 diagrammatically illustrates how the arrangement of FIG. 2 bends in response to the application of a particular sensing force and also acceleration forces in the same direction;

FIG. 4 diagrammatically illustrates the way in which the arrangement of FIG. 2 would bend in response to acceleration forces only, assuming the arrangement is weighted in accordance with the present invention;

FIG. 5 is a view similar to FIG. 4 but showing how the weighted version of FIG. 2 responds to the application of sensing forces and acceleration forces simultaneously;

FIG. 6 diagrammatically illustrates a weighted force sensing assembly designed in accordance with the present invention; and FIGS. 7 and 8 diagrammatically illustrate modified versions of the assembly shown n FIG. 6.

Turning now to the drawings, wherein like components are designated by like reference numerals throughout the various figures, attention is first directed to FIG. 1. This figure illustrates a resonating type of force sensing device 10 of the type described in applicant's co-pending application Ser. No. 112,409, filed Oct. 22, 1987, which application (hereinafter referred to as the Hanson application), now U.S. Pat. No. 4,856,350, is incorporated herein by reference. As seen in FIG. 1 device 10 includes a pair of parallel, elongated vibratable tines 12, means including an oscillating circuit 14 and electrodes 16 for vibrating the tines back and forth in a direction normal to their axes of elongation, means generally indicated at 18 for supporting the tines such that their frequency of vibration is a function of the magnitude of an external force which is applied to a particular location on the supporting means and along a given sensing axis, and means including readout 20 for measuring the vibrating frequency of the tines and for determining therefrom the magnitude of the external force.

Still referring to FIG. 1, the particular support means 18 shown there is in the form of a frame around the vibratable tines. The frame itself is made up of four structural links 20, mounting pads 22 and 24 and generally t-shaped pedestals 26. In a preferred embodiment, the entire support means 18 including its links, pads, and pedestals and the tines themselves are all part of a single integrally formed crystal wafer, as disclosed in the Hanson application The force sensing device 10 is one of many different embodiments of what may be referred to as "framed" resonators (or crystals), several of which including device 10 are illustrated in the previously recited Hanson patent application In a preferred embodiment of the present invention, the framed resonator, actually two such resonators, form part of the overall force sensing device. Therefore, in order to fully appreciate the present invention, it is important to understand the way in which the framed resonator operates. For a detailed discussion, reference is made to the Hanson patent application.

For the present purposes, it will suffice to briefly describe the device 10. It is important to note at the outset that device 10 is designed to sense external forces directed normal to its tines. This is to be distinguished from most resonating types of force sensing devices which sense external forces applied in the direction parallel with their resonating components. In the case of device 10, the external forces, generally indicated by arrows 28, are applied to pad 22 and/or pad 24. Components of these external forces are internally applied to the ends of the tines (in the direction of the tines) by means of links 20 and through pedestals 26, as indicated by arrows 30. Thus, if for example the pad 24 is anchored to a fixed surface, as diagrammatically illustrated in FIG. 1 and if the force 28 is applied to the pad 22 in the direction toward pad 24, the tines 12 will be placed in tension a proportionate amount depending upon the angles defined by links 20. On the other hand, if the external force that is applied to pad 22 is directed away from pad 24, the tines will be placed in compression in an amount proportionate to the external force. This relationship between the tines, links and pads for a number of different frames resonators is described in more detail in the Hanson patent application, as stated above.

Turning to FIG. 1A, sensing device lo is shown supported in a cantilevered fashion adjacent one end thereof such that the opposite end of the device is free to bend to a limited extent about the one end. For purposes of convenience, the cantilevered device is shown in an x, y, z coordinate system. The outer free edge of mounting pad 24 is anchored along its entire length and area to a fixed surface 32 such that the entire frame, that is links 20, pads 22, 24 and pedestals 26, as well as tines 12, lie in the x, y plane when the frame is flat (not bending). The tines and pads extend in the y direction and the axis of the cantilever extends in the x direction. With device 10 mounted in this way, it operates in the same manner described above in conjunction with FIG. 1, with one slight but very important exception. In FIG. 1, the sensing forces 28 were shown as forces in the same plane as support means 18 (that is, in the x, y plane in FIG. 1A). In the case of FIG. 1A, the cantilever supported device is designed to sense forces applied to its free end, that is, to mounting pad 22, in the z direction, that is, normal to the plane of the support means 18, as indicated by the arrows 34. This causes the "beam" to bend to a limited extent about its anchored end in a cantilevered fashion, as indicated by the two way arrow 35. External forces 34 induce proportionate internal forces within support means 18 including ones corresponding to the previously recited forces 30 (FIG. 1) at the ends of the tines. Thus, if external forces 34 act on device 10 in a downward manner, as viewed in FIG. 1A, and if the free end of the cantilever is restrained from moving in the x direction the tines 12 will be placed in compression and if they act in the upward direction the tines will also be placed in compression.

The arrangement illustrated in FIG. 1A, that is, force sensing device 10 and a suitable means for anchoring the device to the surface 32 form part of an overall sensing assembly which is generally indicated by the reference numeral 36 in FIG. 1A. This overall force sensing assembly also includes suitable means for applying external forces 34, to pad 22 in the z direction. Any suitable means compatible with 1 be utilized to apply these forces. In one preferred embodiment bellows are used, as will be described in more detail hereinafter in conjunction with FIGS. 7 and 8. It should be apparent that the electronics shown in FIG. 1 have been omitted from FIG. 1A for purposes of clarity.

Regardless of the way in which forces 34 are applied to mounting pad 22 of device 10, it is important to note that the elongation axes of tines 12 extend in the y direction while the device cantilevers out in the x direction. In other words, the elongation axis of the tines is normal to the cantilever axis of the device. This is to be contrasted with, for example, the arrangement illustrated in Koehler U.S. Pat. No. 4,479,385. As pointed out previously, the vibrating components forming part of the Koehler device extend in a direction parallel with the cantilever axis. Thus, the length of the cantilever must be at least equal to the length of the tines. While this may be satisfactory for measuring relatively small acceleration forces typical of an accelerometer, it may not be satisfactory for use in measuring much larger forces. This is because the relatively large moment created by the long cantilever compromises significantly the structural integrity of the device. The force sensing assembly 36 eliminates this problem by providing a resonating device that is specifically designed so that its tines can be placed crosswise with respect to the cantilevered axis. Specifically, this is possible because of the way in which device 10 is designed to sense external forces normal to the direction of its tines.

The advantage in providing cross tines with respect to the cantilevered axis of assembly 36 is that the assembly in the cantilevered direction can be made shorter than the tines, as illustrated in FIG. 1. Thus, the sensing device can be designed to be relatively narrow in the cantilever direction in order to support relatively large sensing forces while, at the same time, the tines can be relatively long and therefore very sensitive.

Overall force sensing assembly 36 has certain drawbacks because of its use of a single cantilevered force sensing device. For example, in order to insure that the cantilevered forces 34 impart the necessary stress to tines 12 to produce an adequate signal sensitive to the direction of force, for small displacement in that direction, the force sensing device 10 would require some type of more rigid but bendable reinforcing layer to one side thereof. One such layer could be comprised of quartz layer (not necessarily a force sensing device) spaced from and mounted to one side of device 10 as shown in FIG. 1A at 37. In this case, the tines will be placed in compression in response to a downward force and in tension in response to an upward force. Such an assembly would be difficult to construct with precision. In any event, in order to maximize the sensing capability of overall assembly 36 (and the other assemblies to be described), the force sensing devices should be designed so that the cantilevered force being sensed maximizes stress along the length of the tines. On the other hand, applicant has found that the use of two cantilevered force sensing devices positioned adjacent one another in the manner to be described in conjunction with FIG. 2 provides for an excellent overall assembly.

FIG. 2 illustrates a modified force sensing assembly 36' designed in accordance with a preferred embodiment of the present invention. This assembly, which is also shown in the x, y, z coordinate system, is identical to assembly 36, with one main exception. Assembly 36' utilizes two force sensing devices rather than one such device. These devices making up assembly 36' include an upper device 10U and a lower device 10L which are vertically aligned with respect to one another in a slightly spaced apart manner so as to in effect define the top and bottom sides of a beam. The outermost edges of the pads 24 of these devices are anchored to the fixed surface in the same manner as device 10 of assembly 36. The opposite ends of the devices, that is, the outermost edges of pads 22, are connected together by suitable means, for example shear spacer 40. This shear spacer should have sufficient elongation in the x direction and have sufficient contact area with the 36 and 36' assemblies so as to be rigid in shear in the x direction.

If it were not so connected to the lower force sensing device 10L, upper force sensing device 10U of assembly 36' would respond to an internal force 42 in the same way as device 10 forming part of assembly 36 responds to external force 34 without layer 37. Since, however, it is so attached it acts like the outer fiber of a cantilever beam. That is, force 42 induces proportionate compressive load on tines 12, as a result of the bending moment 44. This is because the bending moment places the support means in tension in the direction of arrow 46. At the same time, bending moment 44 places the support means 18 of lower device 10L in compression, as indicated by arrow 48 which, in turn, places the tines of device 10L in tension by a proportionate amount. In other words, the upper tines are placed in compression and the lower tines are placed in tension substantially the same amount, that is, an amount proportionate to the sensing force 42. Thus, the frequency of vibration of one pair of tines increases a given amount in response to externally applied force 42 while the frequency of vibration of the other pair of tines decrease the same amount in response to the force. As a result, the frequency difference of the signal outputs from the two devices, is proportional to external force 42, and the frequency difference inherently cancels out second order non linearities (which can be large) and also temperature coefficients (which can be large) of the basic (common) frequency.

It is to be understood that neither force sensing assembly 36 nor assembly 36' is limited to the use of force sensing device 10, although in the preferred embodiment it must be of the framed type generally disclosed in the previously recited Hanson patent application or at least it must respond to the external force 42 in directions not parallel with the tines.

Assembly 36' described above will operate in a satisfactory manner to sense external forces such as pressure in the sensing direction described so long as there are no other unrelated forces being simultaneously applied to the cantilever in the same direction. Of primary concern is the likelihood that assembly 36 or 36' will be provided within an assembly subjected to acceleration or vibration and gravity. As a result, it is likely that a component of at least one of these forces will be applied to the cantilever in the same direction as the sensing forces.

FIG. 3 diagrammatically illustrates the way in which the two force sensing devices 10U and 10L bend in response to a downwardly directed external force F(s). Note that the support means 18 of the upper device goes into tension while the support means of the lower device goes into compression, as discussed previously However, it should also be noted that the application of gravitational forces (due to acceleration) on the two sensing devices in the same direction as force F(s) will cause the two devices to bend in the same direction. While only one arrow, indicated at F(g) is shown representing these gravitational forces, they would in fact be present along the entire length of the cantilever. In any event, the presence of such gravitational forces would be additive to the external force and could therefore constitute an error in the ultimate output signal from either assembly 36 or assembly 36'.

In order to overcome the problems associated with accelerational forces, as discussed immediately above, the force sensing assembly must be designed so that acceleration forces acting on the force sensing devices in the same direction as the external force being sensed, that is in the z-direction or in the x-direction have substantially no effect on the vibrating frequency of the tines forming part of the overall device. One way in which this can be achieved is to be sure that the acceleration forces applied to the force sensing devices, specifically to their supporting means, would subject the supporting means only to shear loads and not to tension or compression. In order to understand how this can be achieved, attention is directed to FIG. 4 which diagrammatically illustrates a modified version 36" of assembly 36'. In addition, FIG. 4 only shows the effects of bending on the assembly due to acceleration forces. There are no external sensing forces present. Note also that assembly 36" includes an offset weight illustrated at 50 which is diagrammatically shown connected to spacer 40 connecting the free ends of devices 10U and 10L. Offset weight 50 is designed to insure that the free ends of devices 10U and 10L, specifically the outermost edges of their mounting pads 22, tend to remain parallel with the anchored edges of mounting pads 24 and that the devices themselves form s-shaped bends in response to the application of acceleration forces F(a). In other words, so long as only forces F(a) are acting on the two sensing devices, offset weight 50 must be designed such that separator 40 remains parallel with surface 38 and such that the devices bend into the s-shapes shown. This, in turn, insures that the bending of the support means of each force sensing device due to acceleration forces F(a) will subject the support means only to shear loads and not to tension or compression.

Modified force sensing assembly 36" including its offset weight 50 is also diagrammatically illustrated in FIG. 5. However, it is shown in this latter figure in a bending mode as a result of the presence of both sensing force F(s) and acceleration forces F(g). Note specifically that the separator 40 is not parallel with support surface 38 and, therefore, the supporting means of the upper and lower force sensing devices 10U and 10L are, indeed, placed in tension and compression, respectively. This is a result of the presence of sensing forces F(s). However, at the same time, each of the supporting means is also subjected to a shear load (note that it is slightly s-shaped) as a result of acceleration forces.

It is to be understood that the present invention is not directed to any specifically designed counterweight 50 forming part of overall force sensing assembly 36". One with ordinary skill in the art in view of the present teachings could readily design the offset weight to function in the manner described above. Obviously, the particular design would depend upon the force sensing devices themselves as well as dimensional considerations A suitably programmed computer would make the task relatively easy.

Overall assembly 36" has been described in conjunction with two force sensing devices of the type illustrated in FIGS. 1, 1A and 2, that is, force sensing devices of the type illustrated in FIG. 1 and generally described in the previously recited Hanson patent application. While the use of these devices are advantageous in assembly 36", and while in most cases it is desirable to support the tines of each force sensing device in the cross direction with respect to the cantilever axis, offset weighted assembly 36" could be used with resonating types of force sensing devices other than those described in the Hanson patent application.

Turning to FIG. 6, the force sensing assembly 36,'" is shown in the same x, y, z coordinate system as assemblies 36, 36', and 36". There are only two main differences between assembly 36'" and assembly 36". In the case of assembly 36'", an actual offset weight 50' is shown. Note that is it somewhat c-shaped with a central weighted section 52 which is anchored to the free ends of devices 10U and 10L and which serves the same role as previously recited separator 40. An upper section 54 of the counterweight extends rearwardly back towards the fixed end of the assembly and a lower section 56 also extends rearwardly and also downwardly from section 52. It is to be understood, of course, that this particular configuration of offset weight 50' is provided for exemplary purposes only and is not intended to limit the present invention.

Still referring to FIG. 6, it can be seen that overall assembly 36''' includes a bellows 58 mounted to offset weight 50' above and substantially in line with the free end of the cantilever. Bellows 58 serves to apply the sensing force F(s) to the assembly and thereby isolate the assembly from the outside world. The bellows is able to do this because of its high compliance in the x direction to absorb thermal expansion.

Referring now to FIG. 7, overall assembly 36''' is shown with a slightly modified counterweight 50'' and not only bellows 58 but a second bellows 60 in vertical alignment with but smaller in diameter than bellows 58 both of which are subjected to the same pressure. Note specifically that bellows 68 applies sensing force F(s) to the assembly in the same manner shown in FIG. 6. However, bellows 60 applies smaller counterforce F(c) (because of its smaller diameter) which acts on the assembly in the direction opposite the anticipated sensing force, thereby allowing the assembly to sense greater pressure for the given structural integrity of the assembly than would be otherwise possible in the absence of a counterforce.

FIG. 8 is similar to FIG. 7 with one exception. Note specifically that bellows 60 is offset with respect to bellows 58. This helps reduce common mode problems when bellows 58 cannot be positioned optimally, or when the distance between the force sensing devices 10U and 10L is increased to increase load limits. Under these circumstances, the second bellows 60 may be needed to minimize the common mode.

As indicated above, each of the force sensing devices 10 forming part of the overall assemblies 36, 36' and so on is integrally formed from a crystal quartz material and its general configuration is depicted in FIG. 1. Note specifically that the force sensing device is configured as a framed crystal in a preferred embodiment. For best performance of the overall assembly, this framed crystal should have a high percentage output signal frequency change, a high stiffness and strength along the sensing axis, and good coupling of the two tines in the signal mode. In a preferred embodiment, the tines are not attached directly to the frame but rather through, for example, members 26, since the high rigidity of the frame otherwise would reduce the tine-to-tine coupling. Nevertheless, the entire device is constructed of crystal quartz. For different materials, it is nevertheless necessary to have a crystal geometry which will not transfer significant energy to the rest of the transducer structure.

In the prior art involving cantilever configurations, the crystals there were used merely as strain sensors and not as primary load carrying members. In the present invention, the crystal transducers carry all of the load and must not allow excessive deflection of a bellows or diaphragm (where such means are used). Excessive deflection would increase the stress in the bellows and much more so than a diaphragm. The stress in those members would produce some degree of zero offsetting in stability and in particular bias hysteresis (cyclic instability). Since in the present invention the crystals carry all of the load, a stronger crystal is required. The strength requirements of the crystal can be reduced to some extent by increasing the separation between them in the z-direction, that is, the separation between the upper and lower crystals. As the separation increases, however, the crystals tend to bend more in an s-shape rather than in the cantilever arc shape. This increases the common mode signal-in ratio to the output frequency difference signal which is undesirable. In addition to minimizing a common mode signal, it is also desirable to have sufficient compliance of the sensing assembly along the sensing axis to allow some form of overload caging. In many applications the transducer will be subject to loads far in excessive of the maximum load needed to be measured. The transducer must, however, be able to survive and function accurately after being subjected to these overloads. Caging (that is, some form of mechanical stop) will increase the overload capability.

Even with the tines of the crystal transducer at a right angle to the length of the cantilever, as disclosed above, the compliance of the cantilever along the z-direction will usually be much greater at the material limit stress than the compliance of the crystals along their sensing (x) axis. There is a competing requirement to have minimum deflection under the load to be sensed so as to minimize deflection stress in the diaphragm or bellows used to seal the crystals from the surrounding environment and/or to act as a member to convert a pressure to be sensed into a force.

The ideal would be to have two very thin very strong and stiff crystals located with a small separation along the z-direction. The best initial change is therefor simply to increase the thickness of the crystals along the z-direction. This has three practical limitations: First, as the crystals increase in thickness they will ultimately interfere physically with one another; second, as the thickness increases, the fabrication of a crystal with the necessary geometrical tolerance becomes more difficult; and third, as the thickness increases the tine separation must allow plating of the electrodes between the tines and the increased separation makes tine to tine coupling more difficult to achieve.

Due to these practical considerations, at some point the separation of the crystal transducers in the z-direction must be increased. If the common mode frequency becomes too high on a given design, then a second offset bellows as described herein can be used to reduce the force seen by the crystals in a pressure transducer. The second bellows can also be offset to provide more of a moment load on the crystals to increase the ratio of signal frequency difference to common load frequency changes or non linearity caused by excessive s-bending of the crystals.

The discussions immediately above related to certain generalities of the present invention. Additional comments are provided here. First, it should be mentioned that the vibrating crystal transducers produce a variable frequency output very easily processed by digital computers. It should be emphasized that the use of two crystal transducers reduces the effect of common mode instabilities, clock stability sensitivity in the frequency measuring system, as well as common mode even order non-linearities and common mode temperature and time instabilities. There is an additional advantage in the basic design in that the two crystal transducers are close to one another and will tend to track in temperature to improve the cancellation of common mode thermal errors.

Second, it should be pointed out that it would generally be best to evacuate the entire assembly to improve crystal stability and at the very least the assembly (any of the embodiments described above) would need to be sealed to keep external gases and contaminants off of the crystal transducers themselves.

Third, it should be noted that the lowest resonant frequency of the assembly of the present invention should be kept well above any significant environmental vibrational frequencies. At this point, it should be mentioned that there is a need, depending upon the quality of the crystal design and required performance, to avoid designing the sensing assembly with a natural frequency in the range of the crystal signal frequencies to avoid the problem of resonant interaction known as "activity dips".

Finally, it should be pointed out that the framed crystal provides said substantial area for attachment via adhesive such as filled epoxy.

What is claimed:

1. A force sensing assembly, for use in a coordinate system having x, y and z axes, comprising:
   (a) a force sensing device including
      (i) elongated vibratable tine means,
      (ii) means for vibrating said tine means back and forth in a direction normal to its axis of elongation,
      (iii) means supporting said tine means such that its frequency of vibration is a function of the magnitude of an external force which is applied to said supporting means along a sensing axis, and
      (iv) mans for sensing the vibrating frequency of said tine means, whereby to determine therefrom the magnitude of said external force;
   (b) means for mounting said force sensing device in a cantilevered fashion in the x-y plane of the coordinate system, with one end of the device being affixed along the y-axis, the elongation axis of the tine means extending in a direction parallel to the y-axis, the sensing axis extending in a direction parallel to the z-axis, and the end of the device opposite the one end being free to bend to a limited extent about the y-axis;
   (c) means for applying said external force to the device adjacent to the free end thereof and along said sensing axis; and
   (d) weighted means connected with and acting on the free end of said force sensing device for causing acceleration forces acting on said force sensing device in the same direction as said external force to have substantially no effect on the vibrating frequency of said tine means.

2. An assembly according to claim 1 wherein said means for applying said external force includes bellows means.

3. An assembly according to claim 2 wherein said bellows means includes first and second bellows acting along said sensing axis in opposite directions.

4. An assembly according to claim 3 wherein said first and second bellows are coaxial to one another.

5. An assembly according to claim 4 wherein said bellows are of different diameters.

6. An assembly according to claim 3 wherein said bellows have the same diameter.

7. An assembly according to claim 3 wherein said bellows are offset one to another.

8. A force sensing assembly, for use in an x, y, z coordinate system, comprising:
   (a) a force sensing device including
      (i) elongated vibratable tine means,
      (ii) means for vibrating said tine means back and forth in a direction normal to its axis of elongation,
      (iii) support means including a number of structure links and means interconnecting the links to one another to form a closed loop structure and to opposite ends of said tine means such that the elongation axis of said tine means extends between opposite sides of the structure, said support means also including mounting means located along said structure for connecting the support means to an external member capable of applying an external force to the support means along a sensing axis which is neither parallel nor normal to any of the links of said structure such that the support means applies to said tine means its own internal force in response to and varying with said external force and causes the tine means to vibrate at a frequency that varies with the magnitude of said internal force and therefore said external force, and
      (iv) means for sensing the vibrating frequency of said tine means, whereby to determine therefrom the magnitude of said external force;
   (b) means for supporting said force sensing device in an cantilevered fashion adjacent one end thereof such that the opposite end of the device is free to bend to a limited extent about said one end;
   (c) means for applying said external force to the force sensing device along said sensing axis; and
   (d) weighted means connected with and acting on the free end of said force sensing device for causing acceleration forces acting on said force sensing device in the same direction as said external force to have substantially no effect on the vibrating frequency of said tine means.

9. An assembly according to claim 8 wherein the closed loop structure includes four links interconnected to form a parallelogram.

10. An assembly according to claim 1 including reinforcing means supported by said supporting means in said cantilevered fashion directly below and aligned with said force sensing device.

11. A force sensing assembly for use in an x, y, z coordinate system, comprising:
    (a) first and second resonating types of force sensing devices positioned in spaced apart stacked alignment with one another, each of said devices including elongated vibrative tine means;
    (b) means for supporting said force sensing devices within the x, y plane of said coordinate system in a cantilevered fashion adjacent a common end of each device such that the opposite ends of the devices are free to bend to a limited extent about said common ends and such that the elongated direction of said tine means is normal to the cantilevered direction of said devices;
    (c) means for applying an external force to the free ends of said devices in the z direction of said coordinate system, whereby said devices serve to measure said force.

12. An assembly according to claim 1 wherein said force applying means includes first and second bellows acting on the free ends of said devices in opposite directions.

13. An assembly according to claim 11 including weighted means connected with and acting on the free ends of said force sensing devices for causing acceleration forces acting on said force sensing devices in the same direction as said external force to have substantially no effect on the device's ability to accurately measure said external force.

14. A force sensing assembly for use in an x, y, z coordinate system, comprising:
   (a) resonating type of force sensing means comprising a pair of spaced apart, aligned force sensing devices, each of which includes:
      (i) elongated vibratable tine means;
      (ii) means for vibrating said tine means back and forth in a direction normal to the elongation axis of the tine means;
      (iii) supporting means including a number of structure links and means interconnecting the links to one another to form a closed loop structure and to opposite ends of said tine means such that the elongation axis of said tine means extends between a first pair of opposing corners of the structure, said supporting means also including mounting means located along said structure for connecting the supporting means to an external member capable of applying an external force to the supporting means along a sensing axis which is neither parallel with nor normal to any of the links of said structure such that the supporting means applies to said tine means its own internal force in response to and varying with said external force and causes the tine means to vibrate at a frequency that varies with the magnitude of said internal force and therefore said external force; and
      (iv) means for sensing the frequency of said tine means and for determining therefrom the magnitude of said external force;
   (b) means for supporting said force sensing means within the x, y plane of said coordinate system in a cantilevered fashion adjacent one end of the force sensing means such that the opposite end is free to bend to a limited extent about said one end;
   (c) means for applying said external force to the free end of said force sensing means in the z direction of said coordinate system, whereby said force sensing means serves to sense said force; and
   (d) weighted means connected with and acting on said force sensing means for causing acceleration forces acting on said force sensing means in the same direction as said external force to have substantially no effect on the ability of the devices to accurately sense said external force.

15. A force sensing assembly for use in an x, y, z coordinate system, comprising:
   (a) a force sensing device, including:
      (i) elongated vibratable tine means;
      (ii) means for vibrating said tine means back and forth in a direction normal to the elongation axis of the tine means;
      (iii) supporting means including a number of structure links and means interconnecting the links to one another to form a closed loop structure and to opposite ends of said tine means such that the elongation axis of said tine means extends between a first pair of opposing corners of the structure, said supporting means also including mounting means located along said structure for connecting the supporting means to an external member capable of applying said external force to the supporting means along a sensing axis which is neither parallel with nor normal to any of the links of said structure such that the supporting means applies to said tine means its own internal force in response to and varying with said external force and causes the tine means to vibrate at a frequency that varies with the magnitude of said internal force and therefor said external force, means for sensing the frequency of said tine means and for determining therefrom the magnitude of said external force;
   (b) means for supporting said device within the x, y plane of said coordinate system in a cantilevered fashion adjacent one end of the device such that the opposite end is free to bend to a limited extent about said one end; and
   (c) means for applying an external force to the free end of said device in the z direction of said coordinate system, whereby said device serves to sense said force.

16. An assembly according to claim 15 including weighted means connected with and acting on the free end of said force sensing device for causing acceleration forces acting on said force sensing device in the same direction as said external force to have substantially no effect on the vibrating frequency of said tine means.

17. An assembly according to claim 15 including a second force sensing device substantially identical to said first mentioned device and wherein said supporting means supports both of said devices in said cantilevered fashion with said second device directly under and aligned with said first mentioned device such that said external force is applied to the free ends of both of said devices simultaneously.

18. An assembly according to claim 15 including reinforcing means supported by said supporting means in said cantilevered fashion directly below and aligned with said force sensing device.

19. A force sensing assembly for use in an x, y, z coordinate system, comprising:
   (a) a force sensing device including;
      (i) elongated vibratable tine means;
      (ii) means for vibrating said tine means back and forth in a direction normal to the elongation axis of the tine means.
      (iii) supporting means including a number of structure links and means interconnecting the links to one another to form a closed loop structure and to opposite ends of said tine means such that the elongation axis of said tine means extends between a first pair of opposing corners of the structure, said supporting means also including mounting means located along said structure for connecting the supporting means to an external member capable of applying said external force to the supporting means along a sensing axis which is neither parallel with nor normal to any of the links of said structure such that the supporting means applies to said tine means its own internal force in response to and varying with said external force and causes the tine means to vibrate at a frequency that varies with the magnitude of said internal force and therefor said external force; and
      (iv) means for sensing the frequency of said tine means and for determining therefrom the magnitude of said external force; and
   (b) means for supporting said force sensing device adjacent one end thereof in a cantilevered fashion along a cantilever axis extending in the x, y plane of said coordinate system such that the opposite end of said device is free to bend to a limited extent about said one end and such that the axis of elongation of said tine means also extends in the said x, y plane but normal to said cantilever axis.

20. An assembly according to claim 19 including a second force sensing device substantially identical to said first mentioned device and supported by said supporting means in said cantilevered fashion directly below and aligned with said first mentioned device such that said external force is applied to both devices simultaneously and in the same way and weighted means connected to said devices such that said weighted means acts on both devices in the same way.

21. An assembly according to claim 19 including reinforcing means supported by said supporting means in said cantilevered fashion directly below and aligned with said force sensing device.

22. A force sensing assembly, for use in an x, y, z coordinate system, comprising:
 (a) a force sensing device including
  (i) elongated vibratable tine means,
  (ii) means for vibrating said tine means back and forth in a direction normal to its axis of elongation,
  (iii) means supporting said tine means such that its frequency of vibration is a function of the degree to which the tine means is placed in tension or compression along its elongation axis which, in turn, is a function of the magnitude of an external force which is applied to said supporting means along a sensing axis, and
  (iv) means for sensing the vibrating frequency of said tine means, whereby to determine therefrom the magnitude of said external force;
 (b) means for mounting said force sensing device in a cantilevered fashion in the x-y plane of the coordinate system, with the sensing axis extending the z-direction, and the end of the device opposite the one end being free to bend to a limited extent about said one end;
 (c) means for applying said external force to the device adjacent to the free end thereof and along said sensing axis; and (d) weighted means connected with and acting on the free end of said force sensing device for causing acceleration forces acting on said force sensing device in the same direction as said external force to have substantially no effect on the vibrating frequency of said tine means, said weighted means being configured such that said acceleration forces acting on said force sensing device in said z-direction place said tine means in shear along its length and not in tension or compression along its length.

23. A force sensing assembly, for use in an x, y, z coordinate system, comprising:
 (a) a force sensing device including
  (i) elongated vibratable tine means,
  (ii) means for vibrating said tine means back and forth in a direction normal to its axis of elongation,
  (iii) means supporting said tine means such that its frequency of vibration is a function of the magnitude of an external force which is applied to said supporting means and along a given sensing axis, and
  (iv) means for sensing the vibrating frequency of said tine means, whereby to determine therefrom the magnitude of said external force;
 (b) means for supporting said force sensing device in an cantilevered fashion adjacent one end thereof such that the opposite end of the device is free to bend to a limited extent about said one end;
 (c) means for applying said external force to said supporting means along said given sensing axis;
 (d) weighted means connected with and acting on the free end of said force sensing device for causing acceleration forces acting on said force sensing device in the same direction as said external force to have substantially no effect on the vibrating frequency of said tine means; and
 (e) a second force sensing device substantially identical to said first mentioned device and supported by said supporting means in said cantilevered fashion directly below and aligned with said first mentioned device such that said external force is applied to both devices simultaneously and in the same way and such that said weighted means acts on both devices in the same way.

* * * * *